R. H. WALLACE.
DIRIGIBLE LAMP FOR AUTOMOBILES.
APPLICATION FILED JULY 8, 1911.
1,016,722.
Patented Feb. 6, 1912.
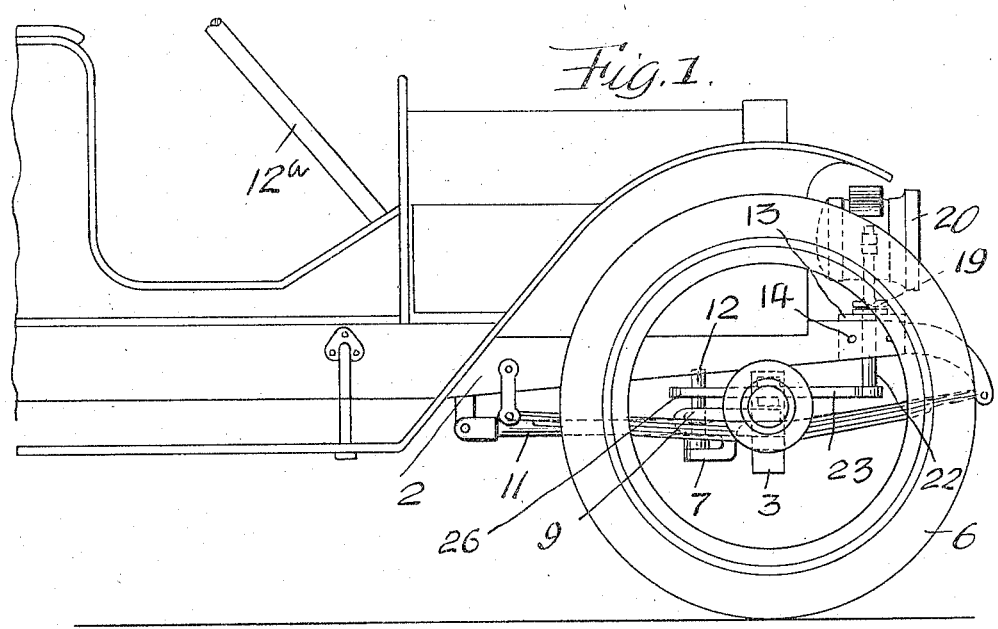
Fig. 1.
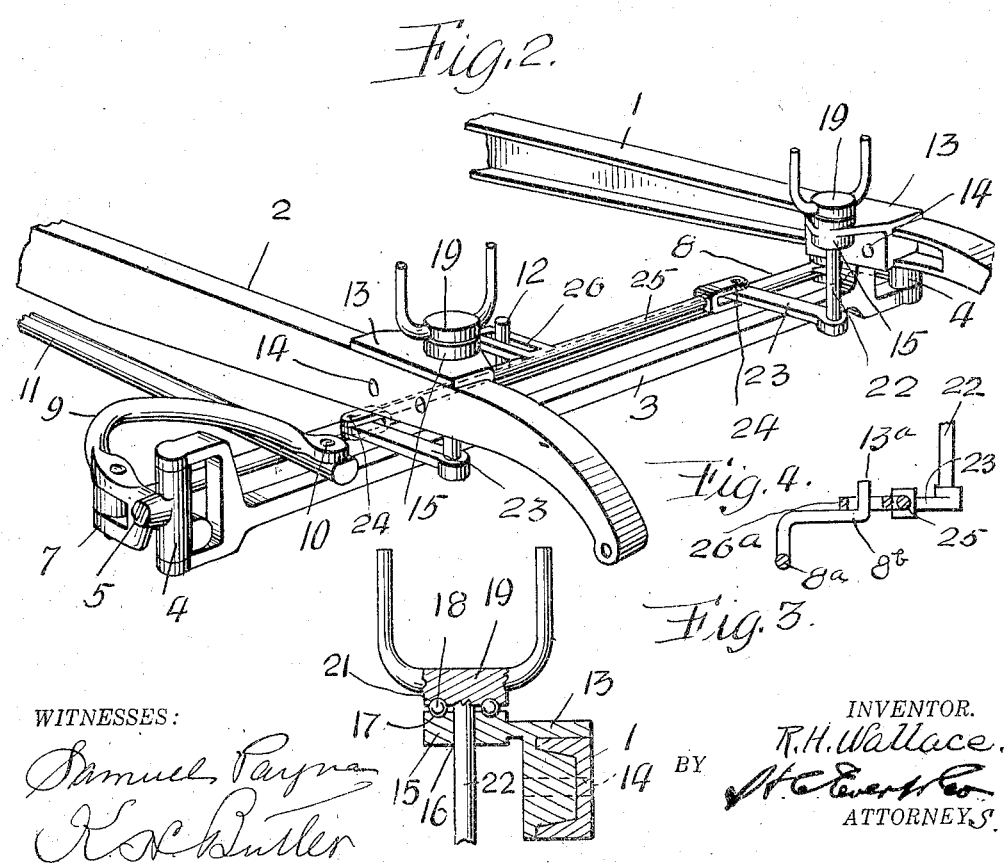
Fig. 2.
Fig. 3.
Fig. 4.
WITNESSES:
Samuel Payne
K. H. Butler
INVENTOR.
R. H. Wallace.
BY
ATTORNEYS.

ROBERT H. WALLACE, OF NEW BRIGHTON, PENNSYLVANIA.

DIRIGIBLE LAMP FOR AUTOMOBILES.

1,016,722.

Specification of Letters Patent. Patented Feb. 6, 1912.

Application filed July 8, 1911. Serial No. 637,510.

*To all whom it may concern:*

Be it known that I, ROBERT H. WALLACE, a citizen of the United States of America, residing at New Brighton, in the county of Beaver and State of Pennsylvania, have invented certain new and useful Improvements in Dirigible Lamps for Automobiles, of which the following is a specification, reference being had therein to the accompanying drawing.

This invention relates to dirigible lamps for automobiles, and the primary object of my invention is to furnish an automobile with a lamp shifting mechanism adapted to be operated by the steering gear of the automobile to shift the lamps whereby the rays of light will be always thrown in the direction the automobile is traveling or in a line in parallelism with the forward wheels of the vehicle.

A further object of this invention is to provide a lamp shifting mechanism that can be applied to various types of automobiles; that is not liable to injury by ordinary use; that is simple and inexpensive to manufacture; and highly efficient for the purposes for which it is intended.

With these and such other objects in view, as may hereinafter appear, the invention resides in a novel construction, combination, and arrangement of parts to be hereinafter specifically described and then claimed.

Reference will now be had to the drawing, wherein:—

Figure 1 is a side elevation of a portion of an automobile provided with dirigible lamps in accordance with this invention; Fig. 2 is a perspective view of the lamp shifting mechanism, Fig. 3 is an enlarged cross sectional view of one of the lamp brackets and holders, and Fig. 4 is a longitudinal sectional view of a modified form of a portion of the shifting mechanism.

The reference numerals 1 and 2 denote the longitudinal side frames of an automobile, and below the forward ends of these frames is the forward axle 3, having knuckles 4, and spindles 5 and forewheels 6. The knuckles 4 are provided with rearwardly extending yokes 7, to which the ends of a connecting rod 8 are pivotally connected. One of the yokes 7, preferably the one at the right hand side of the automobile (but depending upon the position in the car of the steering gear) has a curved arm 9 pivotally connected, as at 10, to a wheel rod 11 adapted to be actuated by the steering post 12$^a$.

The elements just described are of the ordinary and well known type common to various types of automobiles, and in order that my lamp shifting mechanism can be actuated by the connecting rod 8, said rod is provided with a vertical pin 12 intermediate the ends thereof.

The inner sides of the frames 1 and 2 are provided with brackets 13 riveted or otherwise connected to the frames 1 and 2, as at 14. These brackets are located adjacent to the forward end of the frames and each bracket has a bearing 15 provided with a vertical opening 16. The top of the bearing has a ball race for anti-frictional balls 18. Revolubly mounted upon the balls 18 is a lamp holder 19 for a lamp 20, said lamp holder having an annular race 21 to receive the balls 18 and a depending stem 22 extending through the opening 16 of the bearing 15. The lower ends of the stems 22 are provided with cranks 23 having the ends thereof pivotally connected, as at 24, to the ends of a rod 2. This rod, intermediate the ends thereof has a rearwardly extending horizontal stirrup 26 to receive the upper end of the pin 12.

In operation, a movement of the connecting rod 8 shifts the rod 25 in the same direction and through the medium of the cranks 23, the rod 25, link 26 and pin 12 the lamp holders 19 are shifted in unison to move the lamps 20 in the same direction that the wheels 6 are shifted by the steering mechanism of the automobile.

In Fig. 4 of the drawings, the connecting rod 8$^a$ is provided with a forwardly extending arm 8$^b$, having a vertical pin 13$^a$ adapted to engage in a stirrup 26$^a$, carried by the rod 25. The arm 8$^b$ is rigid relative to the connecting rod 8$^a$, consequently this modified form of shifting mechanism will operate similar to the preferred form.

While in the drawing there is illustrated preferred embodiments of the invention, it is to be understood that the structural elements are susceptible to such changes in size, proportion, and manner of assemblage as fall within the scope of the invention as claimed.

What I claim is:—

1. In a lamp shifting mechanism for automobiles, a pair of brackets abutting against and provided with means extending in the inner face of the side frames of the automobile at the forward ends thereof, each of said brackets including a top plate bearing upon the top of the frame and projecting inwardly from the frame, the inwardly extending portion of said plate having the free terminus thereof formed with a boss constituting a bearing, and shiftable lamp holders carrying shafts extending through said bearings.

2. In a lamp shifting mechanism for automobiles, a pair of brackets abutting against and having means extending in the inner face of the side frames of the automobile at the forward ends thereof, each bracket further including an inwardly extending top plate provided with a boss constituting a bearing, said bearings having the upper portions thereof formed with ball races, a lamp holder opposing each of said bearings and having a ball race in its lower face, antifriction balls mounted in said race, and a pair of shiftable shafts extending up through said bearings and connected to the lamp holders.

In testimony whereof I affix my signature in the presence of two witnesses.

ROBERT H. WALLACE.

Witnesses:
JAMES T. WALLACE,
WM. W. WILSON.